United States Patent [19]

Hayashi

[11] Patent Number: 5,305,304
[45] Date of Patent: Apr. 19, 1994

[54] OPTICAL INFORMATION CARRIER HAVING A SPACER SECURELY BONDED BETWEEN DISKS BY ADHESIVE

[75] Inventor: Ryutaro Hayashi, Saitama, Japan

[73] Assignee: Pioneer Electronic Corporation, Tokyo, Japan

[21] Appl. No.: 593,597

[22] Filed: Oct. 3, 1990

Related U.S. Application Data

[63] Continuation of Ser. No. 474,306, Feb. 5, 1990, abandoned, which is a continuation of Ser. No. 68,099, Jun. 30, 1987, abandoned.

[30] Foreign Application Priority Data

Jun. 30, 1986 [JP] Japan ................................ 61-151546
Jun. 30, 1986 [JP] Japan ................................ 61-151547

[51] Int. Cl.$^5$ ................................................ G11B 7/24
[52] U.S. Cl. ........................... 369/275.5; 369/275.1; 369/275.4; 369/286; 346/135.1
[58] Field of Search ............... 369/275.5, 275.1, 275.4, 369/284, 286, 280, 283; 346/135.1, 762, 137

[56] References Cited

U.S. PATENT DOCUMENTS

4,739,345  4/1988  Namba et al. .................. 346/137

FOREIGN PATENT DOCUMENTS

0245953  11/1987  European Pat. Off. ............ 369/275
60-261040 12/1985  Japan .................. 369/283
61-80535   4/1986  Japan .................. 369/283
62-31047   2/1987  Japan .................. 369/275

*Primary Examiner*—Hoa T. Nguyen

[57] ABSTRACT

An optical information record carrier consists of upper and lower optical disks maintained separate from each other by an annular spacer juxtaposed to the outer periphery of the surfaces of the optical disks facing one another. The spacer is glued to the optical disks to produce a carrier with spaced optical disks and an air gap between the disks interior of the annular spacer. To assure sufficient adhesive will remain between the spacer surfaces and their facing optical disk surfaces as these components are squeezed together during the assembly process, one of the spacer of the optical disks is provided with a projection or recess.

7 Claims, 6 Drawing Sheets

OPTICAL INFORMATION CARRIER HAVING A SPACER SECURELY BONDED BETWEEN DISKS BY ADHESIVE

This is a continuation of application Ser. No. 07/474,306, filed Feb. 5, 1990, abandoned which was a continuation application of Ser. No. 07/068,099, filed on Jun. 30, 1989, abandoned.

BACKGROUND OF THE INVENTION

The present invention relates to an optical information record carrier of the type comprising upper and lower optical disks, each with an optical recording surface facing the other, and an annular spacer located along the outer periphery of the upper and lower recording surfaces an air gap thus being formed between the facing recording surfaces interior of the annular spacer.

FIG. 1 illustrates a conventional optical information record carrier 1 of the type to which the present invention obtains. The upper and lower optical disks of the carrier are designated by the reference letter a. An optical information record layer 2 is provided on each of the facing optical recording surfaces. An air gap is maintained between the optical disks a by an annular spacer b located about the outer periphery of the optical disks. The spacer is fixed to the disks a at the location shown in FIG. 1 by an adhesive 3.

The conventional process for assembling the carrier illustrated in FIG. 1 includes the following steps:

1. An optical disk (a) which is to form the lower disk in the carrier 1 is set on a support jig so that its information recording layer 2 faces upwardly.
2. An adhesive 3 is supplied to the outer peripheral portion of the optical disk (a) in the support jig.
3. The spacer (b) is then positioned on the adhesive 3 covering the peripheral portion of the optical disk (a).
4. The adhesive 3 is thereafter also applied to the top of the spacer (b).
5. The other optical disk (a), which is to form the upper disk, is positioned so that its peripheral portion is on the adhesive 3 covering the top of the spacer (b) and so that the information recording layer 2 of the upper optical disk faces downwardly.
6. A weight is then put on the upper optical disk (a) so that the sandwich structure of two optical disks and a spacer therebetween is squeezed together until the adhesive 3 hardens.

A very serious problem with such a conventional structure may be explained as follows.

Before the adhesive 3 hardens, it is so soft that it tends to be pushed out of the area between the spacer and optical disks by the pressure of the weight. Therefore, if the adjoining surfaces of the optical disks (a) and the spacer (b) are completely flat, almost all of the adhesive 3 between these adjoining surfaces is pushed out, leaving at most only several microns of adhesive between the adjoining thickness of surfaces of each optical disk (a) and the spacer (b). This results in very poor adhesion between the disks and spacer, causing the disks to easily separate from the spacer.

If each optical disk (a) and/or the spacer (b) has a warp which cannot be corrected by the pressure of the weight, a gap will exist between the disk and the spacer so that a relatively thick layer of adhesive 3 will exist in the gap while at best only several microns of adhesive will exist between the disks and spacer at all other locations about the outer periphery of the disks. When the thickness of the adhesive 3 is only several microns, its adhesion power decreases markedly thus making it likely that the optical disks (a) and the spacer (b) will separate, even if a relatively thick layer of adhesive exists only in the gap produced by the warped section of the disk and/or the spacer.

SUMMARY OF THE INVENTION

An object of the present invention is to provide an optical information record carrier of the type having an air gap sandwiched between two optical recording disks and a space for maintaining the optical disks spaced from each other which does not exhibit the aforementioned problem of conventional carriers.

Accordingly, it is an object of the present invention to provide an optical information record carrier which is constructed in a way to assure an adequate thickness of adhesive between each optical disk and a spacer sufficient to maintain the optical disks fixed to the spacer.

According to the teachings of this invention, at least one surface of each of the juxtaposed surfaces consisting of a surface of the spacer and its adjoining peripheral portion of an optical disk is provided with projections. Adhesive is provided on these adjoining surfaces except in the areas where the projections contact their adjoining surfaces. Thus, the projections contact, but are not bonded to the optical disk since no adhesive is provided on the above-mentioned contact areas.

According to further teachings of the invention, at least one surface of each of the juxtaposed surfaces consisting of a surface of the spacer and its adjoining peripheral portion of an optical disk is provided with recesses. Adhesive is provided in these recesses.

BRIEF DESCRIPTION OF THE DRAWINGS

FIG. 5 shows a sectional view of a modification of the projection illustrated in FIG. 3;

DETAILED DESCRIPTION OF EXEMPLARY EMBODIMENTS

Figure 1:
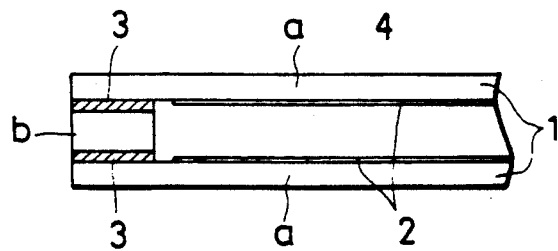
FIG. 1 shows a sectional view of a conventional optical information record carrier.
Figure 2:
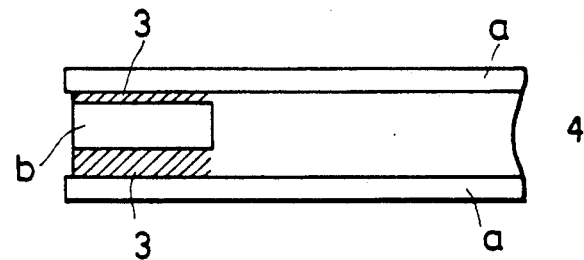
FIG. 2 shows a sectional view of a conventional optical information record carrier which is as shown in FIG. 1 except that the carrier exhibits warp.
Figure 3:
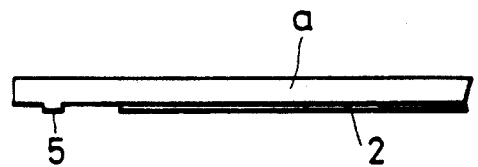
FIG. 3 shows a sectional view of the optical disk of an optical information record carrier according to a first embodiment of the present invention.

According to a first embodiment of the present invention, an optical recording medium such as an optical disk is provided with a projection. This first embodiment will be described with reference to FIGS. 3, 4 and 5. An annular projection 5 is provided on the optical recording surface of each optical disk a near the peripheral edge thereof. A spacer b, whose top and bottom are flat, is manufactured by annularly punching a flat plate.

Figure 4:
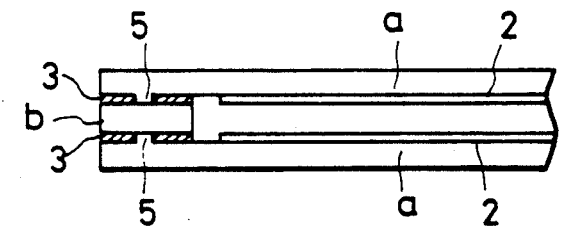
FIG. 4 shows a sectional view of the optical information record carrier employing the optical disk shown in FIG. 3.

The optical disks a and the spacer b are glued to each other in a conventional manner, so that an optical information recording carrier with an air gap sandwiched between optical disks is constructed as shown in FIG. 4.

Since the projection 5 is located in contact with the spacer b, a space whose thickness is not less than the height of the projection is defined around the projection 5 to assure a space for an adhesive 3 adequate to prevent the thickness of the adhesive layer from becoming so thin as to make it likely that the optical disk and the spacer will fall apart from each other, which is the problem of the conventional optical information record carrier.

Figure 5:
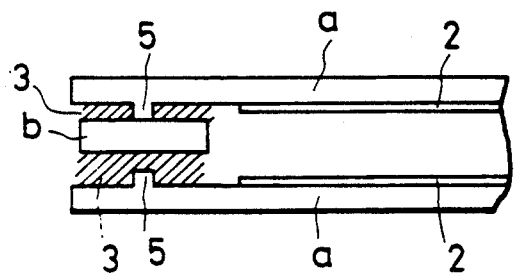
FIG. 5 shows a sectional view of an optical information record carrier which is as shown in FIG. 4 except that the carrier exhibits warp.

Even if at least one of each optical disk a and the spacer b has a warp so that a gap exists between the projection 5, of the optical disk and the spacer, as shown in FIG. 5, the disk and the spacer can be firmly glued to each other at the projection. An adequately thick layer of adhesive 3 between the other optical disk a and the spacer b is assured by the projection 5.

Figure 6:
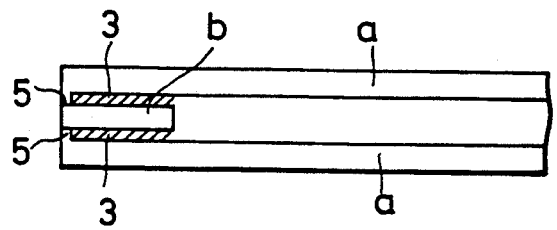
Figure 7:
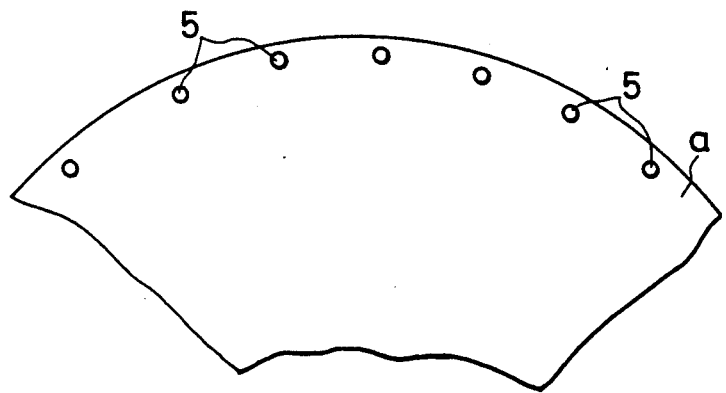
FIG. 7 shows a plan view of another modification of the projection illustrated in FIG. 3.
Figure 8:
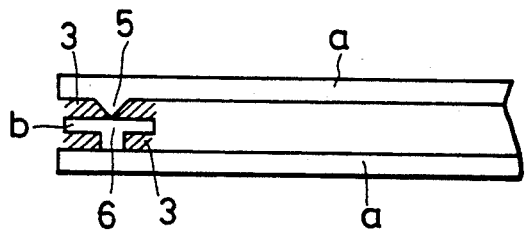
FIGS. 8 and 9 show sectional views of variations of the first embodiment of the invention in which the projection illustrated in FIG. 3 is modified and the configuration of the spacer and the peripheral area of one optical disk varies from that illustrated in FIG. 4.
Figure 9:
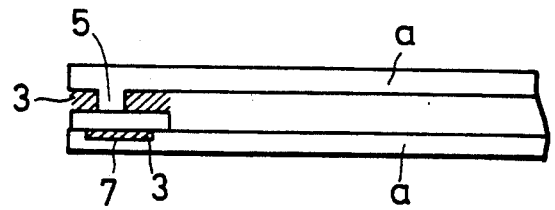

To assure an adequate layer of adhesive 3 using the projection 5, the following is preferable:
1. The height of the projection 5 should be at least 0.001 mm.
2. The width of the projection 5 should be at least 0.001 mm.
3. The projection 5 should be located within the width of the spacer b as shown in FIG. 6. In other words, the projection 5 should be located so as to be able to contact the surface of spacer b.
4. One or more projections 5 may be provided on each optical disk a.
5. The projection 5 need not be annular. A plurality of projections 5 may be provided in a discontinuous manner or dotted manner as shown in FIG. 7.
6. When a plurality of projections 5 are provided in the dotted manner as shown in FIG. 7, the projections may be located along an optional path such as a quadrangle and an ellipse.
7. The cross section of the projection 5 may be shaped as U, V or otherwise.
8. The plurality of projections 5 need not be symmetrically disposed, and each projection 5 may not be symmetrically shaped.
9. The spacer b may be provided with a projection 6 as shown in FIG. 8 or the other optical disk a may be provided with a groove 7 as shown in FIG. 9, in order to glue the spacer and the other optical disk to each other.

Figure 10:
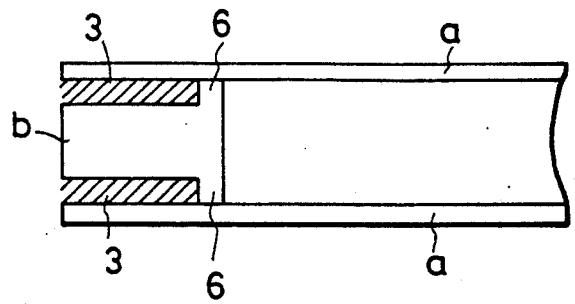
FIG. 10 shows an optical information record carrier according to a second embodiment of the present invention, in which a spacer is provided with projections.
Figure 11:
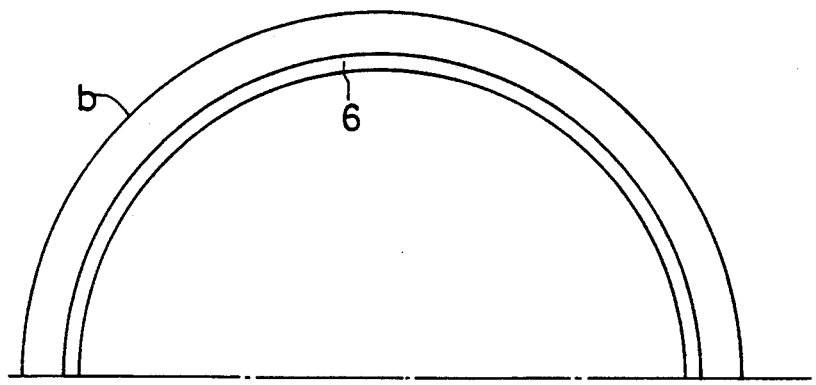
FIG. 11 shows a plan view of the spacer according to the second embodiment of the invention.
Figure 12:
FIG. 12 shows a sectional view of a spacer according to the second embodiment of the invention.

According to a second embodiment of the present invention, the spacer is provided with annular projections. This second embodiment will be described with reference to FIGS. 10, 11, 12 and 13. The peripheral portions of optical disks a are flat. The annular projections 6 are provided on the top and bottom surfaces of the spacer b as shown in FIGS. 11 and 12. The optical disks a are glued to the spacer b in a conventional manner, so that an optical information record carrier with an air gap between optical disks is constructed as shown in FIG. 10.

Figure 13:
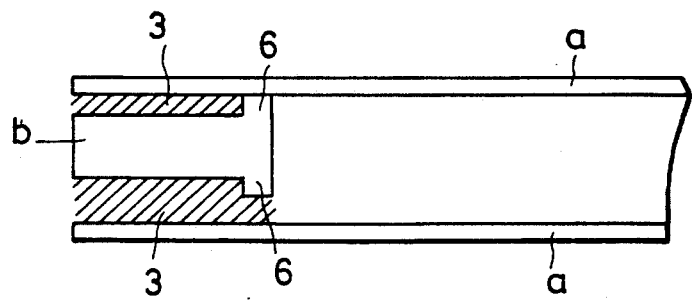
FIG. 13 shows an optical information record carrier which is as shown in FIG. 10 except that is exhibits warp.

Each of the projections 6 serves to assure an adequate thickness of adhesive 3 to maintain the optical disks fixed to the spacer. When at least one of the optical disks a and the spacer b has a warp as shown in FIG. 13, the projection 6 performs as explained with reference to the warped disk or spacer used in the carrier according to the first embodiment.

Figure 14:
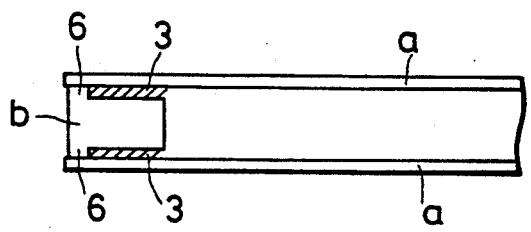
FIGS. 14 and 15 show sectional views of modifications of the spaces according to the second embodiment.
Figure 15:
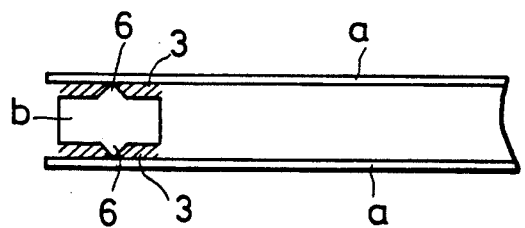
Figure 16:
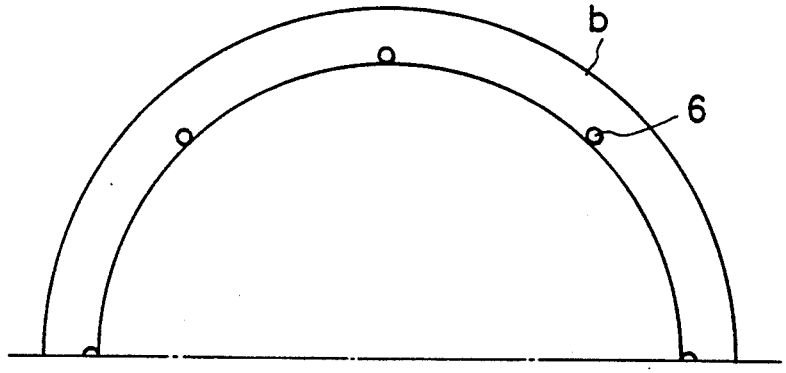
FIG. 16 shows a plan view of another modification of the spacer according to the second embodiment.
Figure 17:
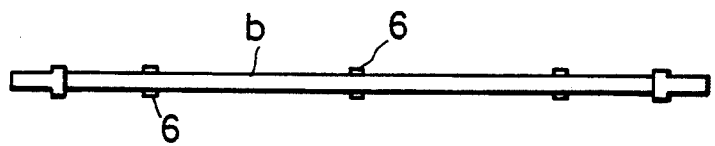
FIG. 17 shows a sectional view of the modification shown in FIG. 16.

The projections 6 may be located along the outer circumferential edge of the spacer 5 as shown in FIG. 14. The cross-section of each of the projections 6 may be modified as shown in FIG. 15. Each of the projections 6 may be provided in a discontinuous manner or dotted manner as shown in FIG. 16 and FIG. 17.

In the first and the second embodiments of the invention, projections are provided on the optical disks or on the spacer and are located in contact with the adjacent spacer surface or with the adjacent optical disks to assure the necessary minimum thickness of adhesive necessary to maintain the optical disks fixed to the spacer.

Figure 18:
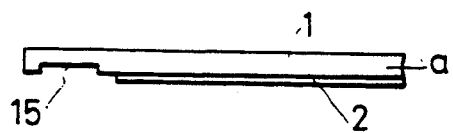
FIG. 18 shows a sectional view of the optical disk of an optical information record carrier according to a third embodiment of the present invention, in which the optical disks are provided with recesses.

According to a third embodiment of the present invention, an optical information recording medium such as an optical disk is provided with a recess. This embodiment will be described with reference to FIGS. 18, 19 and 20.

In the third embodiment of the invention, each optical disk a is provided with an annular recess 15 along the peripheral edge of its optical recording surface. A spacer b whose top and bottom surfaces are flat, is manufactured by annularly punching a flat plate. The optical disks a and the spacer b are glued to each other in the above-described conventional manner, so that an optical information record carrier with an air gap between optical disks, is constructed as shown in FIG. 19.

According to a feature of the invention, the annular recess 15 are located in contact with the spacer b and are of a surface area and depth sized to accommodate adhesive 3 sufficient to assure adequate adhesive to maintain the optical disks a fixed to the spacer b. With the arrangement of the third embodiment of the invention, the adhesive 3 is prevented from being all pushed out from between the disks and spacer as the optical disks a and the spacer b are squeezed together to produce an optical information record carrier.

Figure 19:
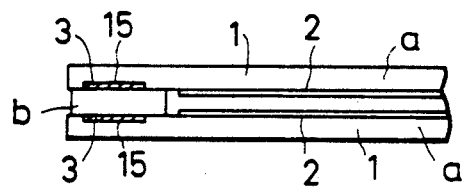
FIG. 19 shows a sectional view of an optical information record carrier employing the optical disk shown in FIG. 18.
Figure 20:
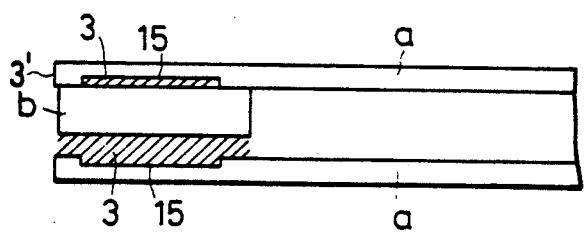
FIG. 20 shows a sectional view of an optical information record carrier which is as shown in FIG. 19 except that is exhibits warp.

If the optical disks a and the spacer b are completely flat, their surfaces are placed in tight contact with each other as shown in FIG. 19. If at least one of the optical disk a and the spacer b is warped, a gap exists between the disk and the spacer as shown in FIG. 19. In this case, the thickness of the adhesive 3 is increased in the gap and not reduced. Therefore, the adhesion strength of the applied adhesive 3 remains strong when the carrier is produced according to the teaching of the third embodiment of the invention even when a disk on the spacer is warped.

Figure 21:
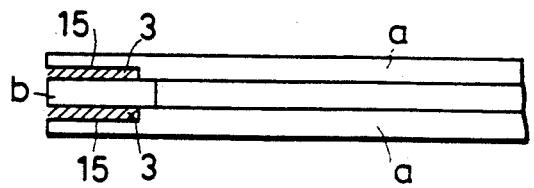
FIG. 21 shows a sectional view of a modification of the optical disk with recess according to the third embodiment.
Figure 22:
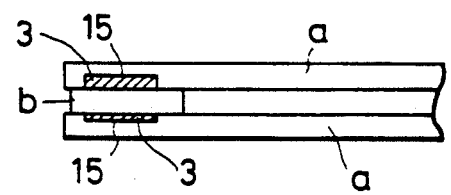
FIGS. 22, 23, 24, 25 and 26 show sectional views of modifications of the optical disk according to the third embodiment of the invention.
Figure 23:
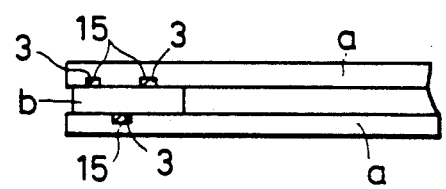
Figure 24:
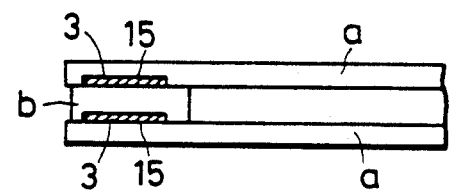
Figure 25:
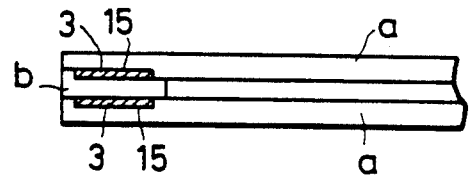
Figure 26:
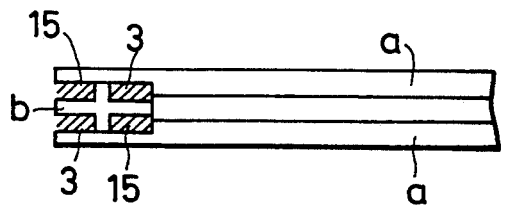

To use the recess 15 for adhesive 3 so that the optical disk a and the spacer b remain fixed to each other, the following are preferable:
1. The width of the recess 5 should be at least 0.1 mm but less than the width of the glued surface of each of the optical disk a and the spacer b.
2. The optical disk portion between the periphery of the optical disk and the recess need not exist as shown in FIG. 21. In other words, the periphery 3' of the optical disk shown in FIG. 20 does not need to exist, as shown in FIG. 21.
3. The depth of the recess 15 may be optionally set to be between 0.001 mm and the thickness of the optical disk a.
4. A number of recesses 15 may be provided.
5. The recess 15 need not be continuous along the entire circumference of the optical disk and may be divided into a plurality of recesses.
6. The cross-section of the recess 5 may be shaped as a U, V, a square or the like.
7. The recesses 5 of both optical disks a need not be the same, as shown in FIGS. 22 and 23.
8. An optical combination of recess forms may be set for the spacer b and the optical disk a, as shown in FIGS. 24, 25 and 26.

Figure 27:
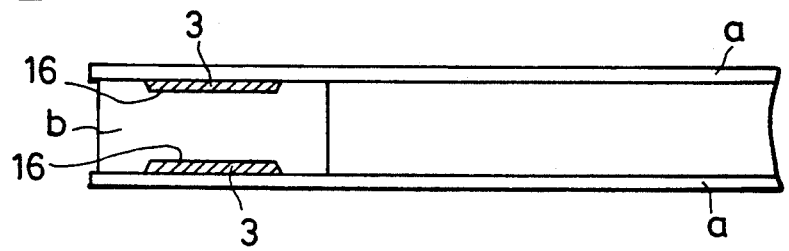
FIG. 27 shows a sectional view of an optical information record carrier according to a fourth embodiment of the present invention and in which a spacer is provided with recesses.

According to a fourth embodiment of the present invention, a spacer is provided with recesses. This embodiment will be described with reference to FIGS. 27 and 28. In the embodiment, the glued surface of the peripheral portion of each optical disk a is flat. Annular recesses 6 are provided in the top and bottom surfaces of the spacer b. The optical disks a and the spacer b are glued to each other in the conventional manner, so that an optical information record carrier is constructed as shown in FIG. 27. An adhesive 3 fills each recess 6 to assure an adequate layer of adhesive to firmly maintain the optical disks a fixed to the spacer b.

Figure 28:
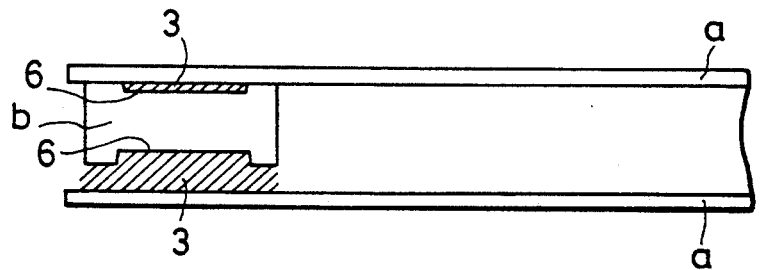
FIG. 28 shows an optical information record carrier which is the same as that shown in FIG. 27 except that it exhibits warp.

If at least one of the optical disks a and the spacer b is warped, one side of the spacer is located in tight contact with the optical disk a as shown in FIG. 28. In this case, a gap exists between the spacer b and the other optical disk a so that the thickness of the adhesive 3 is increased by the thickness of the gap. With this arrangement, the adhesion power of the applied adhesive 3 remains high notwithstanding the warped disk.

Figure 29:
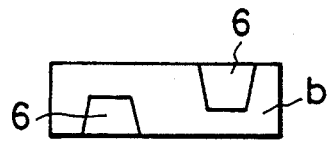
FIG. 29 shows a sectional view of a spacer which is a modification of the spacer of the fourth embodiment of the invention and in which the recesses of the top and bottom of the spacer are not located symmetrically with each other.

As shown in FIG. 29, the recesses in the top and bottom surfaces of the spacer b do not need to be alike or symmetric with each other. Additionally, the recesses 6 may be modified in the manner taught with respect to the third embodiment of the invention.

As described above, the optical disks or the spacer is provided with the recesses according to the third and the fourth embodiments of the invention. The adhesive fills each recess to firmly secure the optical disks to the spacer.

According to the present invention, at least one of an optical information recording medium such as an optical disk and a spacer is provided with a projection or a recess, as described above, to assure an adequate amount of adhesive to firmly glue the disks to the spacer as they are squeezed together. The projections and recesses function to solve the problem of adhesive expulsion when the disks and spacer are squeezed together even when at least one of the optical recording medium and the spacer is warped. When the optical information record carrier is produced according to the teachings of the invention, it is unlikely that the optical recording medium and the spacer will separate from each other.

Figure 30:
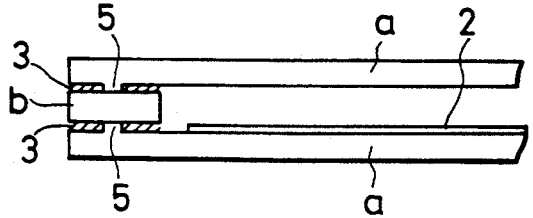
FIG. 30 shows a sectional view of the optical information record carrier of another embodiment where one of the disks does not have an optical recording surface.

In the embodiments of the present invention described above, both the upper and lower optical disks a and a of the optical information record carrier have optical recording surfaces. Furthermore, the present invention is applicable to an optical information record carrier where only one of the two disks has an optical recording surface, for example as shown in FIG. 30. The optical information carrier of FIG. 30 comprises the optical disk of FIG. 3 and a disk formed by applying the embodiment of FIG. 3 to a disk without an optical recording surface.

The foregoing preferred embodiments of the invention are set forth herein by way of illustration and are not intended to limit the scope of the invention as defined in the claims appended hereto. Other embodiments as well as variations and modifications of the embodiments disclosed herein should be readily apparent to those skilled in the art based on the teachings herein and those other embodiments and variations and modifications of embodiments are intended to be with the scope of the appended claims.

What is claimed is:
1. An optical information record carrier comprising:
upper and lower optical disks, at least one of said optical disks having an optical recording surface;
a spacer located between said upper and lower optical disks to maintain said optical disks separated from one another, said spacer comprising a main body portion and at least one projection having a predetermined uniform height and projecting from a surface of said main body portion toward the optical recording surface of said at least one of said optical disks, said at least one projection contacting but not being bonded to the optical surface of said at least one of said optical disks so as to form an air gap between said surface of said main body portion and the optical recording surface of said at least one of said optical disks; and adhesive, disposed in said air gap, for gluing said main body portion to at least one of the upper and lower disks.

2. An optical information record carrier as claimed in claim 1, wherein there is a plurality of projections, and wherein said plurality of projections is provided on the surfaces of said spacer facing said upper and lower optical disks.

3. An optical information record carrier as claimed in claim 2 wherein said projections are symmetric to each other on the surfaces of the spacer facing the optical disks.

4. An optical information record carrier as claimed in claim 2 wherein each of said projections on the surfaces of said spacer are annular and continuous.

5. An optical information record carrier as claimed in claim 1 wherein said spacer is annular and juxtaposed with the outer periphery of said upper and lower optical disks.

6. An optical information record carrier as claimed in claim 1 wherein the cross section of said at least one projection is rectangular shaped.

7. An optical information record carrier as claimed in claim 1 wherein said at least one projection is rectangular.

* * * * *